United States Patent [19]

Clark et al.

[11] 4,386,846
[45] Jun. 7, 1983

[54] METHOD AND APPARATUS FOR LIMITING BOOK WEAR WHILE BEING COPIED

[75] Inventors: William D. Clark, Longmont; Earl G. Edwards, Boulder; Carl A. Queener, Lyons, all of Colo.

[73] Assignee: International Business Machines Corporation, Armonk, N.Y.

[21] Appl. No.: 296,683

[22] Filed: Aug. 27, 1981

[51] Int. Cl.³ .................. G03B 27/32; G03B 27/52
[52] U.S. Cl. ..................................... 355/25; 355/75
[58] Field of Search ................. 355/25, 75, 8, 11; 271/267

[56] References Cited

U.S. PATENT DOCUMENTS

| | | | |
|---|---|---|---|
| 3,510,218 | 5/1967 | Limberger et al. | 355/51 |
| 3,806,239 | 4/1974 | Inoue et al. | 355/8 |
| 3,807,856 | 4/1974 | Rodriguez | 355/25 X |
| 3,988,062 | 10/1976 | Burton et al. | 355/23 |
| 3,988,065 | 10/1976 | Mileski et al. | 355/75 X |
| 4,056,320 | 11/1977 | Mochimaru et al. | 355/75 |
| 4,186,919 | 2/1980 | Miciukiewicz | 271/267 |

OTHER PUBLICATIONS

Three pages from manual describing the Eskofot 1001 Office Photocopier.
Research Disclosure, Oct. 1979, No. 18649, "Registration Mechanism".
IBM Technical Disclosure Bulletin, Jun. 1980, vol. 23, No. 1, pp. 69-70, "Recirculating Paper Path Pivoted for Jam Clearance".

Primary Examiner—Richard A. Wintercorn
Attorney, Agent, or Firm—Charles E. Rohrer

[57] ABSTRACT

A moving document copier machine with a hinged cover of a recirculating semiautomatic document feed device for pivoting away from the top surface of the machine to expose the document feed path and enable the copying of a book or like object. A spine or rail means is provided along one edge of the document feed path to receive the center break of an opened book. Roll means interior to the document feed path support that portion of the book to be copied as it moves across the viewing station while other rollers, exterior to the document feed path, support that portion of the book not to be copied. A gate is provided to register the book.

19 Claims, 5 Drawing Figures

METHOD AND APPARATUS FOR LIMITING BOOK WEAR WHILE BEING COPIED

This invention relates to document copier machines and more particularly, to a compact copier apparatus with features enabling the copy of multipage bound documents, such as books.

BACKGROUND OF THE INVENTION

Compact copier apparatus is frequently designed as a moving document copier where the document to be copied is moved across a stationary viewing station. This design is chosen over alternative arrangements in order to conserve space and make the copier machine smaller. One of the problems, however, of a moving document copier is that a multipage document, such as a book, cannot be fed into the document moving mechanism since such feeders are customarily built to receive a single page at a time only. Consequently, when it is desired to copy a multipage document, the operator must remove the document feeder, place the book on top of the copier and manually press down on the top of the book. When the machine starts, the book is moved by rollers on top of the machine across the viewing station. Unfortunately, as the book moves across the viewing station, there is a tendency for the book to rotate if the manual pressure being exerted by the operator's hand has a component of force direction other than downward into the copier surface. Since it is difficult for the operator to maintain a manual force on a moving object with a downward component only, book rotation causing distorted copies is a frequently encountered problem in moving document machines.

A previous solution to the problem described above is illustrated by U.S. Pat. No. 3,510,218 where a transparent plate has been provided upon which a book is placed. The plate, with the open book, is then positioned upon the top of the copier in the document feed path with both facing pages of the open book within the copy path. The operator places his hand on the top of the book to press the center break of the book down to get a good copy of the print near the center break. He then turns the machine on, and the transparent plate is driven across the viewing station by rollers positioned on the top of the machine. The operator continues to press on the book as it is moved with the transparent plate. At least two serious problems result, however, from this solution to the problem; (1) when not in use, the transparent plate must be stored, (2) since the plate usually has a substantial thickness, the lens must have a significant depth of view in order to image properly both a single document which is fed without the plate and a book which is fed with the plate. This consequently adds to the cost of the lens or requires some additional components in the document feed path as described in the above-mentioned patent, and (3) hand pressure on the back of the binding of the open book tends to break the binding.

Even in copy machines where documents are held in a stationary manner while being copied, operators find it necessary to press down on the unsupported center break of a book thus tending to destroy the binding of the book.

In addition to the problems described above, note that when the operator presses down on top of the book, the pages tend to roll into the center break, the book gutter, creating a tendency to crease the book pages and distort the copy.

The instant invention provides superior solutions to the above problems. It provides the important advantage of a supporting mechanism for the center break of a book to lessen book wear. In a moving document copier, it provides the advantage of enabling the copying of multipage documents preventing rotation as the document moves across the viewing station and it does this with or without the use of a supplementary transparent plate. It also provides rolling support for both the page to be copied and a facing page which lies outside of the document feed path, thus further preventing book wear and, by lessening drag during the copy process, lessening the probability of a distorted copy as well.

SUMMARY OF THE INVENTION

This invention is a document copier machine where documents to be copied are placed in the document feed path of the machine and where an elongated rail or spine along the edge of the viewing station and parallel to it protrudes above the viewing surface to receive the center break or gutter of an open multipage bound document to be copied. In that manner, the multipage document, such as a book, is supported by the spine at the binding thus lessening wear on the book binding during the copy operation. Moreover, in a moving document machine, the spine is located along the edge of a document feed path and parallel to it so that the spine prevents the book from rotating as it moves across the viewing station. An important feature of the invention in the moving document copier embodiment is the provision of rolls both interior and exterior to the document path of the page to be copied to support and move in a rolling manner both the page to be copied and the facing page which does not pass over the viewing station.

In a preferred moving document copier embodiment, the top surface of the copier machine is positioned at an angle of approximately 20° to the horizontal so that gravity assists in moving the book across the viewing station. When a book is placed in the feed path, it is placed against a gate to assure that the book is properly registered. When the gate is released, the exterior rolls mentioned above, and interior rolls located within the document path, are started to move the book down the inclined top surface and across the viewing station. When copying single documents, the cover of a recirculating semiautomatic document feed (RSADF) device covers the feed path; when a book is copied, the RSADF cover is pivoted out of the way to an open position. When in the open position, a start button located on the bottom surface of the RSADF cover is exposed. This start button is used for beginning the book copying operation. Also, in the preferred embodiment, the RSADF cover, when closed, covers both the interior and exterior rollers.

In the moving document copier preferred embodiment, a first group of exterior rolls is located to support the book when it is registered against the gate and a second group of exterior rolls is located in closer proximity to the viewing station. The exterior rolls may be driven at the same speed as the interior rolls, or, for cost reasons, one or more of these groups may be made freely rotatable.

DETAILED DESCRIPTION

Figure 1:
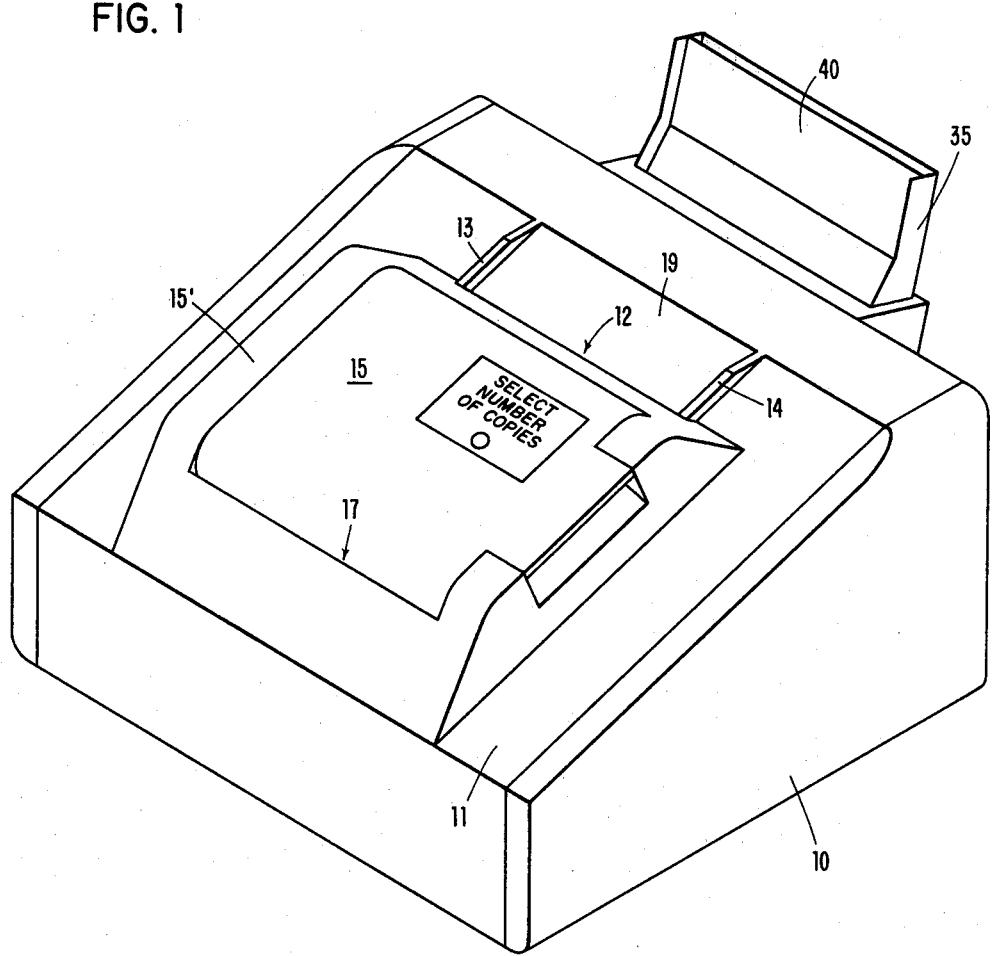
FIG. 1 is a perspective drawing of a moving document compact copier utilizing this invention and further having a recirculating semiautomatic document feed device. The cover of the document feed device is shown in place on the top surface of the machine.

FIG. 1 shows a document copier machine with an exterior housing 10 containing a top surface 11 inclined at an angle of approximately 20° to the horizontal. Positioned on that top surface is a document feed path 19, the sides of which are generally defined by reference edge 13 and spine 14 which protrude above the top surface 11. Document feed path 19 forms a part of a recirculating semiautomatic document feed device 15 together with hinged cover 15' and all associated rolls and guides. When cover 15' is closed, as shown in FIG. 1, cover 15' and document feed path 19 provides an entry slot 12 for the entrance of single documents to be copied. After copying, these documents exit from the RSADF through exit slot 17 located in the cover 15'.

A paper cassette 35 is shown in FIG. 1 for feeding copy paper into the machine. The completed copy is returned against the face 40 of the cassette.

Figure 2:
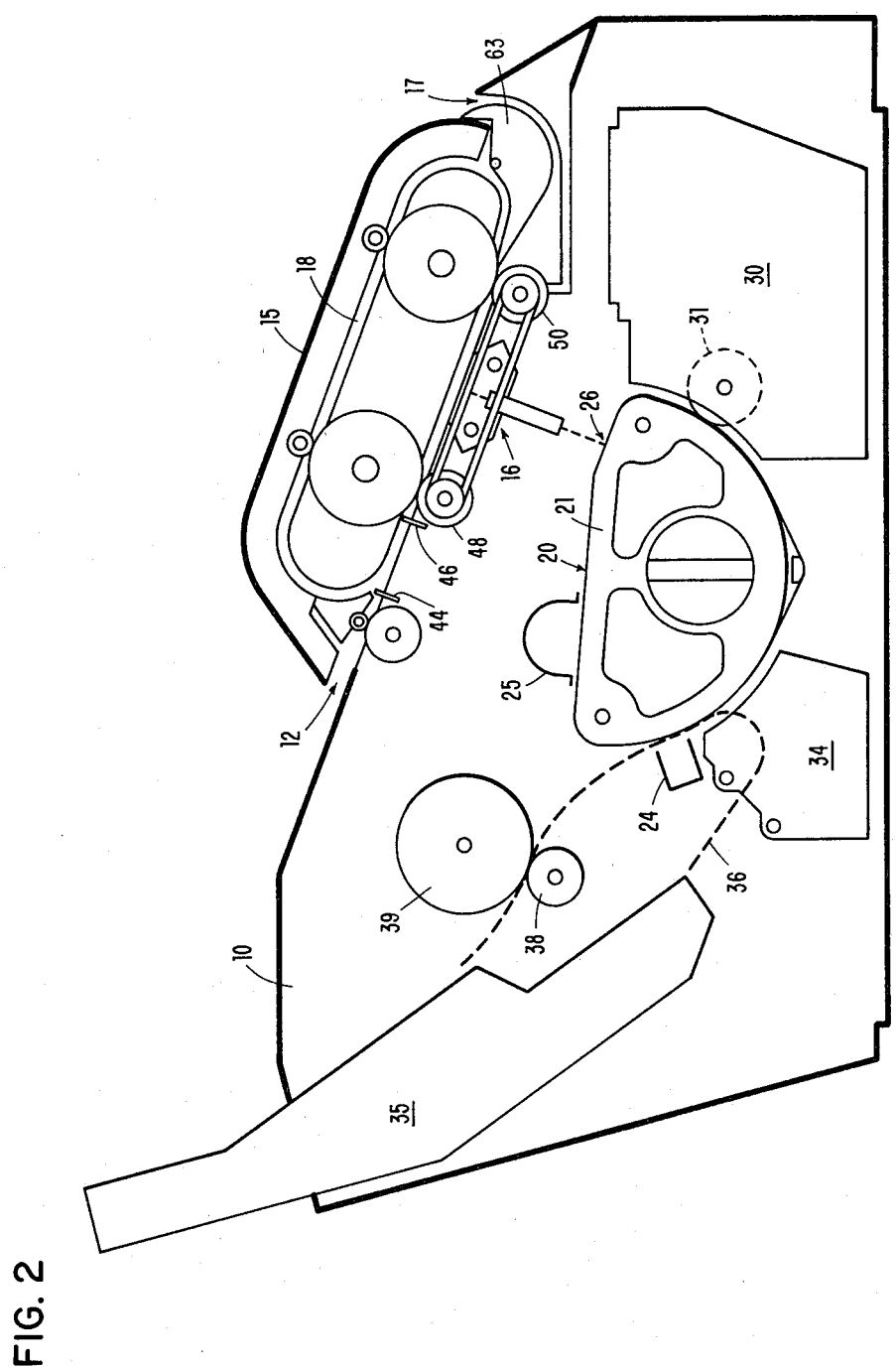
FIG. 2 is a schematic diagram showing the paper path of the recirculating semiautomatic document feed device of FIG. 1 together with the paper path and process path of an electrophotographic copier machine embodiment.

FIG. 2 is a schematic drawing showing the interior side view of the copier machine illustrating the document path 18 of the recirculating semiautomatic document feed device 15. FIG. 2 also shows the copy paper path 36 from cassette 35 and the various processing stations located along photoconductive belt 20.

A document to be copied is manually inserted through input slot 12, where it is sensed and driven to queuing gate 44. If no other document is being copied, gate 44 is released allowing the document to advance to registration gate 46. When the machine is ready, gate 46 is released allowing drive rolls 48 and 50 to move the document across the fiber optic viewing station 16. The original document, after processing, is either delivered to the exit slot 17, or is recirculated for multiple copies by return paper path 18 as determined by the position of gate 63. Gate 63 is automatically positioned in accordance with the number of copies selected by the operator and the number of copies already produced from that original document.

The image of the original document thus scanned is placed upon a continuous loop photoconductor (PC) belt 20, which is retained in place by means of a guide frame assembly 21.

The copier machine shown in FIG. 2 takes an electrophotographic two-cycle process configuration wherein corona 25 operates as a charge corona, to place an appropriate electrostatic voltage level on PC belt 20. The image of the original document is placed upon belt 20 at imaging location 26 by selective discharge, based upon the information contained in the original document. This image is then developed by developer unit 30 which places toner on appropriate areas of belt 20 as it passes the magnetic brush roller 31.

The paper gating mechanism 34 controls the introduction of copy sheets from cassette 35 to the photoconductor belt 20 in appropriate synchronism with the movement of the toned image on belt 20. Corona 24 operates as a transfer corona to transfer toner from belt 20 onto the copy sheets. The copy sheets continue to the fuser comprised of rollers 38 and 39 where the toner image is fused to the copy sheet. The toned copy sheet is then exited from the machine.

Figure 3:
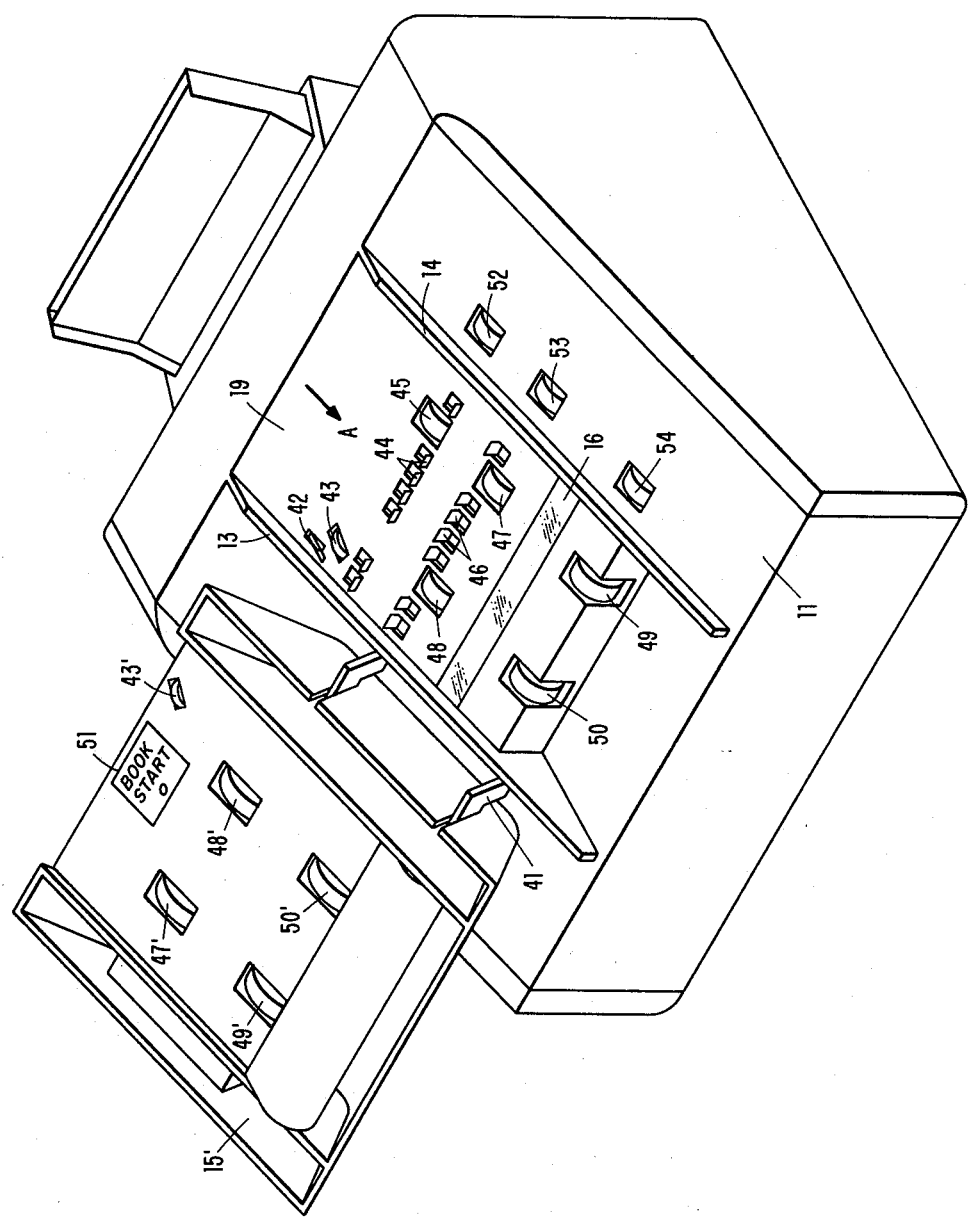
FIG. 3 illustrates the machine of FIG. 1 with the cover of the recirculating semiautomatic document feed device open to expose the top surface of the machine containing the document feed path.

FIG. 3 shows the machine of FIG. 1 with the cover 15' of the recirculating document feed device 15 rotated around the hinges 41 to an open position. In this position, the entirety of the document feed path 19 along the top surface 11 is exposed to view. FIG. 3 shows document feed path 19 with a document reference edge 13 along one side and a spine or rail guide means 14 positioned along the opposite edge. Entry sensor 42, aligner roll 43, queuing gate 44 and registration gate 46 precede viewing station 16 in paper feed direction A. All document moving rolls protrude above the plane of top surface 11 with "interior" rolls 45, 47, 48, 49 and 50 lying within path 19 and "exterior" rolls 52, 53 and 54 located across the rail guide means 14 outside of the document path. These rolls may be driven by a motor, not shown in FIG. 2, through an appropriate transmission so that all driven rolls operate to move the document at the same speed down the document feed path.

The open cover 15' in FIG. 3 shows the corresponding rollers 43', 47', 48', 49' and 50' which mate with the rolls on the top surface 11 to form roll nips when the cover 15' is closed. The open cover in FIG. 3 also exposes a manual start button 51 for use when copying books.

When a single sheet is to be copied and cover 15' is in place, entry switch 42 automatically starts machine operation when the document is sensed, and aligning roll 43 operates to position the single sheet against reference edge 13 and queuing gate 44. After alignment, and if there is no preceding sheet in the device 15, gate 44 is dropped and mating rolls 43 and 43' move the paper down the feed path 19 in direction A to registration gate 46. At the proper point in the machine cycle, gate 46 is dropped allowing rolls 43, 47 and 48 to move the document across a stationary elongated document viewing station 16, the major dimension of which is perpendicular to feed path direction A. Rolls 49 and 50 continue to move the document out through exit slot 17 or around through the return paper path 18 if multiple copies are to be made.

If multiple copies are being made, the sheet recirculates through document path 18 shown in FIG. 2 until it returns to gate 46. Again, at the proper point in the machine cycle, gate 46 will drop initiating another copy sequence. During this period of recirculation, a next sheet can be inserted by hand to entry sensor 42 causing it to move by aligning roll 43 against the queuing gate 44. In that manner, once the required number of copies have been made of the first document and it has exited through slot 17, gate 44 will drop allowing the second document to proceed to gate 46 for a repeat of the copy cycle.

Figure 4:
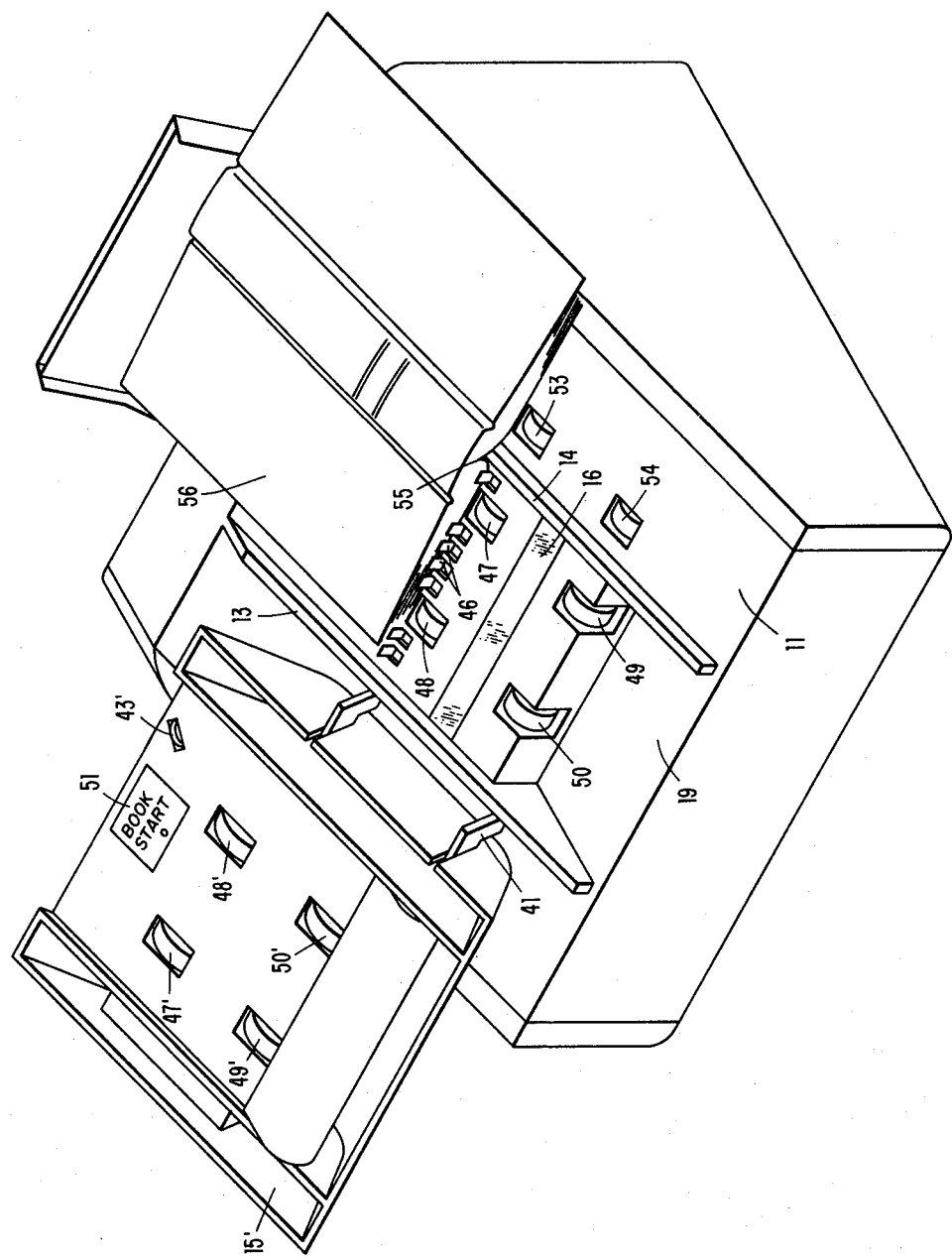
FIG. 4 is similar to FIG. 3 with a book positioned against the registration gate prior to being copied.

FIG. 4 shows the center break, or gutter, 55 of book 56 positioned along rail means or spine 14. The page of the opened book to be copied has been placed by hand in document feed path 19 in a manner to register it against gate 46. The portion of the book outside of the document feed path rests upon exterior roll 52 shown in FIG. 3 but covered by the book in FIG. 4 and the portion of the book which is to be copied rests upon rolls 43 and 45 within the document feed path. Upon pressing the start button 51, gate 46 drops and rolls 43, 45 and 52 are energized to move the book down document feed path 19 and across the viewing station 16.

Rolls 52, 53 and 54 can be driven in synchronism with rolls 45, 47, 48, 49 and 50. However, for economic reasons, only roll 52 may be driven while rolls 53 and 54 can form a second group of exterior rolls which are freely rotating. Whether all exterior rolls are driven or not, the book 56 is moved across the viewing station 16 with the center break of the book held in position on the rail guide means 14. If needed, hand pressure can be exerted on the back of the book 56 in order to keep the page of the book snug against viewing station 16. It should be noted, however, that the support given the book binding by spine 14 tends to prevent binding damage from the use of such hand pressure. It should also be noted that the exterior rolls support the portion of the book not being copied and assist in rolling the book down the document feed path, thus reducing drag on the page surface which would otherwise be present and which would tend to damage the book.

Figure 5:
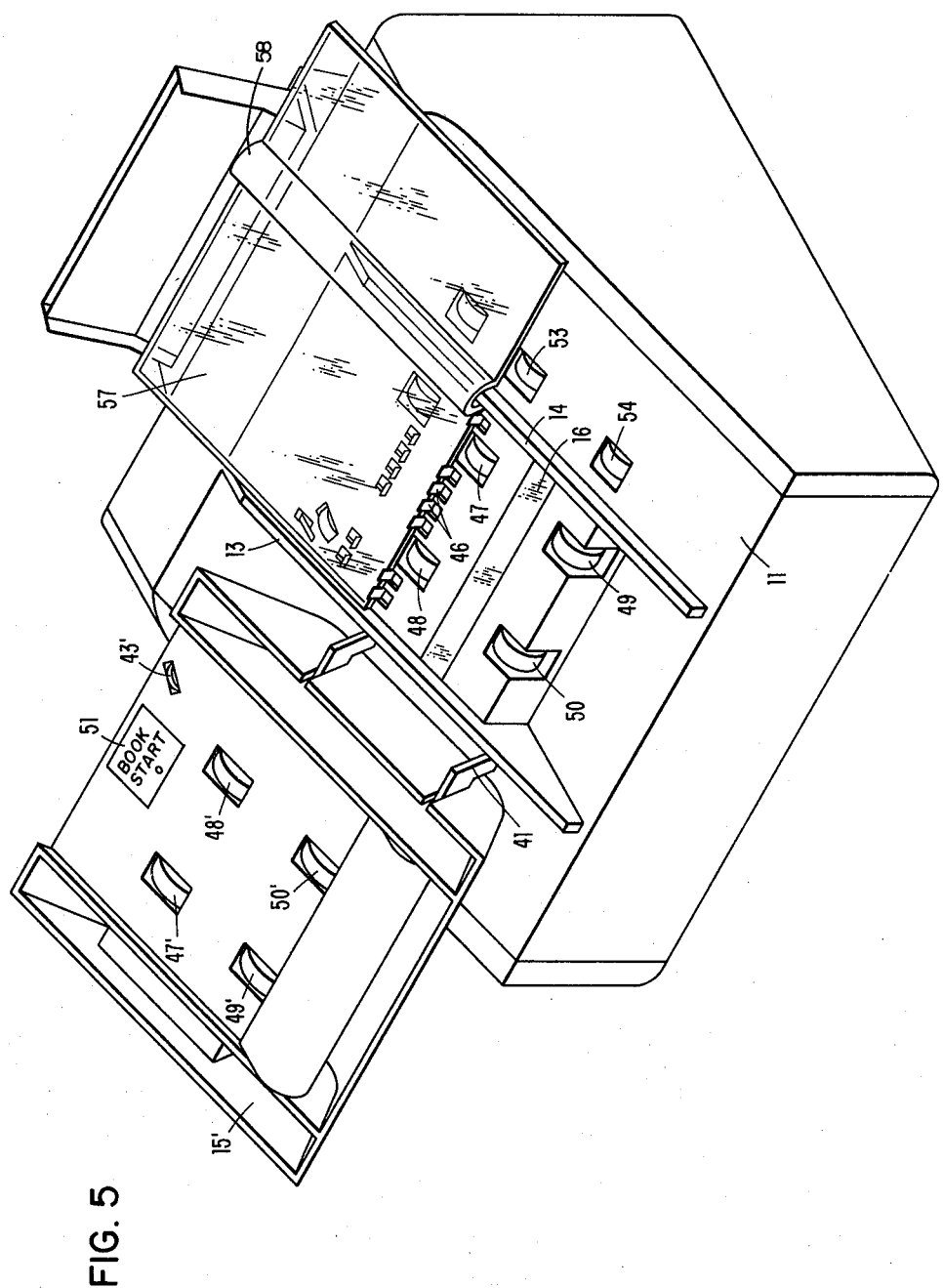
FIG. 5 shows the machine of FIG. 3 with a transparent plate in place to carry small odd-shaped documents or books.

FIG. 5 shows the machine of FIG. 3 with a transparent glass plate 57 in place against gate 46. The plate 57 may be used to aid in transporting odd-shaped documents down the document feed path across the viewing station and may be used to transport a book, if desired. Plate 57 is illustrated with an optional lip 58 which fits over rail means 14 so that the gutter of the book to be copied can fit over the lip 58 and be supported thereby.

Thus, a book copying method and apparatus has been described which preserves the integrity of the structure of bound documents as well as preventing rotation of the book during the copying process. The invention makes use of the fact that the pages of a book are bound together by orienting the book such that one page at a time is copied while the facing page is supported exterior to the document path. In that manner, a spine may be provided to support the gutter of the open book and prevent its destruction. In a stationary document copier, the spine is located alongside the viewing station at a reference edge. In a moving document machine, as illustrated, the spine is located alongside the viewing station perpendicular to the major dimension thereof and parallel to the direction of document movement across the viewing station. Moreover, rolling motion may be provided to assist in moving the book across the viewing station and further lessening wear on the pages of the book. Such rolling motion may be provided for both the page to be copied and the facing page which lies outside of the viewing area.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A document copier machine comprising:
   a housing containing elements for producing a copy of an original document;
   top surface areas located on said housing in a substantially flat plane providing a document path for documents to be copied;
   a stationary transparent document viewing station located substantially within said document path;
   rail guide means protruding above the plane of said top surface means for receiving the center break of a bound but opened multipage document such as an opened book, the length of said rail guide means positioned perpendicular to the major dimension of said viewing station and parallel to the direction of document movement down said document path; and
   exterior roll means located across said rail guide means from said document path, said exterior roll means protruding through the plane of said top surface means for supporting the portion of said opened multipage document lying outside of said document path and for reducing drag present in moving said multipage document across said viewing station.

2. The machine of claim 1 wherein said exterior roll means is driven.

3. The machine of claim 1 wherein said exterior roll means are comprised of a first nondriven roller group and a second driven roll group.

4. The machine of claim 3 wherein the plane of said top surface is established at an angle to the horizontal to afford a gravity assist for the documents when moved down the document path across the viewing station.

5. The machine of claim 4 wherein said angle is within a range of approximately 15° to 25°.

6. The machine of claim 1 further including a transparent tray positioned within said path for supporting the portion of said opened multipage document lying within said document path.

7. The machine of claim 6 wherein the plane of said top surface is established at an angle to the horizontal to afford a gravity assist for the documents when moved down the document path across the viewing station.

8. The machine of claim 7 wherein said angle is within a range of approximately 15° to 25°.

9. The machine of claim 1 further including interior roll means within said document path protruding through the plane of said top surface means for moving documents across said viewing station.

10. The machine of claim 9 further including exterior roll means located across said rail means from said document path, said exterior roll means protruding through the plane of said top surface means for supporting the portion of said opened multipage document lying outside of said document path and for reducing drag present in moving said multipage document across said viewing station.

11. The machine of claim 10 wherein said interior and exterior roll means are driven at the same speed.

12. The machine of claim 1 further including gate means for registering documents to be copied, said gate means protruding upwardly through the plane of said top surface means, the length of said gate means positioned parallel to the major dimension of said document viewing station.

13. The machine of claim 12 further including interior roll means within said document path protruding through the plane of said top surface means for moving documents across said viewing station.

14. The machine of claim 13 further including exterior roll means located across said rail means from said document path, said exterior roll means protruding through the plane of said top surface means for supporting the portion of said opened multipage document lying outside of said document page and for reducing drag present in moving said multipage document across said viewing station.

15. The machine of claim 14 wherein said interior and exterior roll means are driven at the same speed.

16. The machine of claim 13 wherein said exterior roll means comprise a first nondriven roller group and a second driven roll group.

17. A method of copying multipage bound documents such as a book by a document copying machine comprising the steps of:

placing the open book on the viewing surface of said machine with one page to be copied within a document feed path and a facing page to said one page to be copied outside of said document feed path;

providing a support protruding substantially above said viewing surface under the center break of said book at the binding to aid in preserving the structural integrity of the binding; and moving said book down said document feed path across a viewing station and retaining said support under said center break substantially throughout the moving step.

18. The method of claim 17 further including the step of providing rolling support under said page to be copied to aid in moving the book down the document feed path.

19. The method of claim 18 further including the step of providing rolling support under said facing page to aid in moving said book and aid in preserving its integrity.

* * * * *